United States Patent
Ihlar et al.

(10) Patent No.: US 12,052,326 B2
(45) Date of Patent: Jul. 30, 2024

(54) PACKET ACKNOWLEDGMENT TECHNIQUES FOR IMPROVED NETWORK TRAFFIC MANAGEMENT

(71) Applicant: Telefonaktiebolaget LM Ericsson (publ), Stockholm (SE)

(72) Inventors: Marcus Ihlar, Älvsjö (SE); Zaheduzzaman Sarker, Järfälla (SE); Simone Ferlin, Stockholm (SE); Mirja Kuehlewind, Ludwigsburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 17/621,651

(22) PCT Filed: Jun. 25, 2020

(86) PCT No.: PCT/EP2020/067816
§ 371 (c)(1),
(2) Date: Dec. 21, 2021

(87) PCT Pub. No.: WO2021/001250
PCT Pub. Date: Jan. 7, 2021

(65) Prior Publication Data
US 2022/0360644 A1 Nov. 10, 2022

Related U.S. Application Data

(60) Provisional application No. 62/870,119, filed on Jul. 3, 2019.

(51) Int. Cl.
*H04L 67/562* (2022.01)
*H04L 12/46* (2006.01)
*H04L 67/563* (2022.01)

(52) U.S. Cl.
CPC ........ *H04L 67/562* (2022.05); *H04L 12/4633* (2013.01); *H04L 67/563* (2022.05)

(58) Field of Classification Search
CPC . H04L 67/562; H04L 67/563; H04L 12/4633; H04L 67/56; H04L 67/565;
(Continued)

(56) References Cited

U.S. PATENT DOCUMENTS 5,537,533 A * 7/1996 Staheli ................ G06F 11/2071
714/5.11
6,359,882 B1 * 3/2002 Robles .................... H04L 47/10
370/389
(Continued)

FOREIGN PATENT DOCUMENTS

WO   WO 02/093867    * 11/2002

OTHER PUBLICATIONS

Thomson, M., "Version-Independent Properties of QUIC", QUIC Internet-Draft, Apr. 12, 2019, pp. 1-9, IETF.
(Continued)

*Primary Examiner* — Madhu Woolcock
(74) *Attorney, Agent, or Firm* — Ericsson Inc.

(57) ABSTRACT

A proxy server (700) receives, from a sending device, a packet intended for a receiving device (600). The proxy sewer (700) sends, to the receiving device (600), a promise frame (300) indicating that the proxy server (700) will deliver the packet to the receiving device (600) later. The receiving device (600) receives the promise frame (300) from the proxy server (700), and sends an acknowledgement of the packet to the sending device via the proxy sewer (700). The proxy server (700) forwards the acknowledgement of the packet from the receiving device (600) to the sending device, and delivers the packet to the receiving device (600) after having forwarded the acknowledgement
(Continued)

to the sending device. The receiving device (600) receives the packet from the proxy server (700) after having sent the acknowledgement of the packet to the sending device via the proxy server (700).

22 Claims, 10 Drawing Sheets

(58) Field of Classification Search
CPC . H04L 41/0896; H04L 47/76; H04L 43/0876; H04L 43/0882; H04L 47/10; H04L 41/11; H04L 47/12
See application file for complete search history.

(56) References Cited

U.S. PATENT DOCUMENTS

| | | | | |
|---|---|---|---|---|
| 6,496,481 | B1* | 12/2002 | Wu | H04L 1/1628 370/242 |
| 7,072,979 | B1* | 7/2006 | Aviani, Jr. | H04L 67/1001 709/239 |
| 8,179,904 | B2* | 5/2012 | Hidaka | H04L 47/2466 709/239 |
| 8,462,630 | B2* | 6/2013 | Samuels | H04L 67/56 370/254 |
| 8,463,843 | B2* | 6/2013 | Subbanna | H04L 47/10 709/228 |
| 8,773,976 | B1* | 7/2014 | Puliatti | H04L 1/1829 370/216 |
| 2002/0032865 | A1* | 3/2002 | Golubchik | H04L 9/3297 713/178 |
| 2002/0078132 | A1* | 6/2002 | Cullen | H04L 51/42 709/201 |
| 2003/0105877 | A1* | 6/2003 | Yagiu | H04L 47/2441 709/237 |
| 2003/0149715 | A1* | 8/2003 | Ruutu | H04L 47/323 718/100 |
| 2004/0033806 | A1* | 2/2004 | Daniel | H04W 72/542 455/423 |
| 2005/0060426 | A1* | 3/2005 | Samuels | H04L 69/16 709/238 |
| 2006/0133379 | A1 | 6/2006 | Krishnan et al. | |
| 2006/0253622 | A1* | 11/2006 | Wiemann | H04L 69/163 370/413 |
| 2008/0192820 | A1* | 8/2008 | Brooks | H04N 21/2385 348/E7.071 |
| 2008/0304481 | A1* | 12/2008 | Gurney | H04L 69/16 370/389 |
| 2009/0046704 | A1* | 2/2009 | Sternam | H04L 65/40 370/352 |
| 2009/0316579 | A1* | 12/2009 | Tang | H04L 69/163 370/231 |
| 2010/0188989 | A1* | 7/2010 | Wing | H04L 43/065 370/252 |
| 2010/0325299 | A1* | 12/2010 | Rao | H04L 1/1854 709/230 |
| 2011/0225285 | A1* | 9/2011 | Patel | G06F 9/4856 718/1 |
| 2011/0243149 | A1* | 10/2011 | Xie | H04L 65/1033 370/410 |
| 2012/0033579 | A1* | 2/2012 | Liao | H04L 1/1854 370/252 |
| 2012/0120805 | A1* | 5/2012 | Maze | H04L 1/1835 370/235 |
| 2012/0151028 | A1* | 6/2012 | Lu | H04L 67/59 709/223 |
| 2012/0207062 | A1* | 8/2012 | Corbellini | H04W 74/08 370/256 |
| 2012/0290727 | A1* | 11/2012 | Tivig | H04L 69/163 709/227 |
| 2013/0223364 | A1* | 8/2013 | Akkarakaran | H04W 72/04 370/329 |
| 2013/0250853 | A1* | 9/2013 | Eravelli | H04W 28/0273 370/328 |
| 2014/0189093 | A1* | 7/2014 | du Toit | H04L 63/166 709/224 |
| 2014/0250237 | A1* | 9/2014 | Shama | H04L 47/36 709/232 |
| 2014/0293891 | A1* | 10/2014 | Okuda | H04B 7/15528 370/329 |
| 2015/0019620 | A1* | 1/2015 | Gidron | H04L 67/1097 709/203 |
| 2015/0117462 | A1* | 4/2015 | Brandt | H04L 65/70 370/392 |
| 2016/0134546 | A1* | 5/2016 | Anderson | H04L 47/25 370/235 |
| 2016/0198012 | A1* | 7/2016 | Fablet | H04L 67/55 709/231 |
| 2016/0352602 | A1* | 12/2016 | Numakami | H04L 67/02 |
| 2017/0006125 | A1* | 1/2017 | Yasuma | H04L 67/56 |
| 2017/0026483 | A1* | 1/2017 | Ruellan | H04L 67/55 |
| 2017/0117999 | A1* | 4/2017 | Weston | H04L 41/0654 |
| 2017/0180261 | A1* | 6/2017 | Ma | H04L 47/12 |
| 2018/0211364 | A1* | 7/2018 | Nam | G06T 3/60 |
| 2018/0292522 | A1* | 10/2018 | Cavendish | H04L 9/3297 |
| 2018/0359328 | A1* | 12/2018 | Fablet | H04L 65/65 |
| 2019/0199835 | A1 | 6/2019 | Deval et al. | |

OTHER PUBLICATIONS

Iyengar, J., et al., "QUIC: A UDP-Based Multiplexed and Secure Transport", QUIC Internet-Draft, Apr. 23, 2019, pp. 1-143, IETF.
Thomson, M., et al., "Using TLS to Secure QUIC", QUIC Internet-Draft, Apr. 23, 2019, pp. 1-43, IETF.

* cited by examiner

PACKET ACKNOWLEDGMENT TECHNIQUES FOR IMPROVED NETWORK TRAFFIC MANAGEMENT

TECHNICAL FIELD

The present application generally relates to managing packet traffic on a communication network, and more particularly relates to packet acknowledgement techniques involving a proxy server.

BACKGROUND

Quick User Datagram Protocol (UDP) Internet Connections (QUIC) is a UDP-based, stream-multiplexed, secure transport protocol with an integrity protected header and encrypted payload. Unlike the traditional transport protocol stack using TCP (Transmission Control Protocol) residing in the operating system kernel, QUIC can easily be implemented in the application layer. This brings lots of flexibility in terms of evolution, congestion control and implementation of new features. QUIC is work in progress at the Internet Engineering Task Force (IETF).

QUIC is a likely candidate to become the main transport protocol in the User Plane. It is expected that most web applications (which today run mainly over HTTP/HTTPS) will migrate to QUIC.

An important distinction between QUIC and TCP is that QUIC is an encrypted protocol. Protocols that run on top of TCP are commonly protected by the Transport Layer Security (TLS) protocol. Although TLS provides protection of the payload, TCP headers remain exposed. QUIC, on the other hand, provides protection of both payload and packet headers.

A QUIC packet is protected using two separate keys, one for protecting the packet header and another for protecting the packet payload. Furthermore, a QUIC packet header consists of less fields than the TCP counterpart. Instead, QUIC makes use of frames that are part of the protected packet payload for transport related information such as acknowledgements.

QUIC allows for migration of a connection between different IP addresses and ports. Such migration can happen implicitly (e.g., due to rebinding of Network Address Translation (NAT) state) or explicitly (e.g., because the client decides to use a separate access network as it becomes available).

Congestion control is an important component of reliable transport protocols such as TCP or QUIC. An aim of congestion control is to prevent the network from becoming congested, and if congestion occurs, to prevent the network from remaining congested, while utilizing the available bandwidth. Congestion control algorithms are typically implemented at the sender only and do not require any specific protocol support. Although there are algorithms that require both sender and receiver side support, such algorithms are not widely deployed in the Internet. Many congestion control algorithms are differentiated by the type of signals they use to infer congestion, how they respond to congestion, and how they probe for bandwidth.

Classic congestion control algorithms are loss-based. That is, such algorithms use packet loss as a congestion indicator, typically implementing an Additive Increase Multipliable Decrease (AIMD) model as a congestion response. An AIMD-based congestion control response increases the Congestion Window (CWIN) linearly until a congestion event is detected, at which point it reduces the CWIN by a multiplicative factor. The most common AIMD algorithm is (New) Reno. Another common loss-based congestion control algorithm is CUBIC, which increases the CWIN as a cubic function with an inflection point around the window size of the most recent loss event.

Other algorithms use delay and/or bitrate measurements conjointly as an indicator of congestion in order to control the sending rate and the congestion response. These algorithms tend to be more proactive in mitigating network congestion, as delay measurements are generally more commonly available than packet loss, and also work better in networks where packet loss happens for reasons other than congestion (e.g., due to channel corruption in wireless environments).

A proxy is an intermediary program or network device that handles network traffic on behalf of another (e.g., one or more communication endpoints, such as a sending device and/or a receiving device). In communication between client and server endpoints, a proxy may act as a server to the client endpoint, and/or a client to the server endpoint, e.g., for the purpose of making requests on behalf of either or both of the endpoints. Requests may be serviced internally or by passing them on, possibly with translation, to other servers. Moreover, a proxy can be used to provide congestion control and/or other beneficial services.

A "transparent proxy" is a proxy that does not modify the request or response beyond what is required for proxy authentication and identification.

A "non-transparent proxy" is a proxy that modifies the request or response to provide some added service to the user agent, such as group annotation services, media type transformation, protocol reduction, and/or anonymity filtering.

A "reverse proxy" basically is a proxy that pretends to be the actual server (as far as any client or client proxy is concerned), but it passes on the request to the actual server that is usually sitting behind a firewall layer.

A "Performance Enhancement Proxy (PEP)" is used to improve the performance of protocols on network paths where native performance suffers due to characteristics of a link or subnetwork on the path.

In view of the above, it is clear that a proxy can play an important role in the network, e.g., by enhancing congestion control between communication endpoints. Although many solutions for implementing such proxies are well-understood when the communication is based on TCP, such proxies may be unable to provide the same or similar benefits when the communication is based on QUIC, given the differences between the TCP and QUIC protocols. Accordingly, new techniques for network communication involving QUIC may be required.

SUMMARY

Embodiments of the present disclosure generally relate to acknowledging a packet based on a promise to deliver the packet before the packet is actually delivered. Such embodiments may enable congestion control to be performed for communication between endpoints using a variety of different protocols. In particular, a proxy can buffer a received packet and send a promise frame to a receiving device promising to deliver that packet later, and receive an acknowledgement of the packet from the receiving device in response, i.e., before having actually received the packet. This acknowledgement can be forwarded to the sender of the packet, which can, e.g., continue to send packets as though the packet has been delivered, even if the proxy is retaining the packet for congestion control purposes or other network management-related reasons.

Accordingly, embodiments of the present disclosure include a method, implemented by a receiving device. The method comprises receiving, from a proxy server, a promise frame indicating that the proxy server will deliver a packet to the receiving device from a sending device later. The method further comprises sending an acknowledgement of the packet to the sending device via the proxy server. The method further comprises receiving the packet from the proxy server after having sent the acknowledgement of the packet to the sending device via the proxy server.

In some embodiments, the method further comprises receiving, from the proxy server, a first encapsulation packet that comprises a further packet sent by the sending device and the promise frame. Receiving the promise frame from the proxy server comprises receiving the promise frame within the first encapsulation packet. In some such embodiments, sending the acknowledgement of the packet comprises sending the acknowledgement of the packet in a second encapsulation packet, the second encapsulation packet further comprises an acknowledgement of the first encapsulation packet, and the acknowledgement of the packet also acknowledges the further packet.

In some embodiments, the method further comprises receiving a packet number of the packet in the promise frame. The packet number indicates that the proxy server will deliver the packet to the receiving device later. In some such embodiments, the method further comprises receiving, in the promise frame, an indication of one or more additional packet numbers corresponding to additional packets received by the proxy server that the proxy server promises to deliver to the receiving device later. The indication of the one or more additional packet numbers comprises a number specifying how many contiguous packets immediately preceding the packet are comprised in the additional packets and are promised to be delivered, according to the promise frame, to the receiving device later. In some such embodiments, the method further comprises receiving, in the promise frame, a further indication of one or more other packet numbers corresponding to other packets not received by the proxy server from the sending device and indicating that, according to the promise frame, delivery of the other packets to the receiving device is not promised by the proxy server. In some such embodiments, the other packets are contiguous and immediately precede the contiguous packets immediately preceding the packet, and the indication of the one or more additional packet numbers further comprises a further number specifying how many contiguous packets immediately preceding the other packets are comprised in the additional packets and are promised to be delivered, according to the promise frame, by the proxy server to the receiving device (600) later.

In some embodiments, the promise frame comprises a range count field indicating how many packet ranges are indicated by the promise frame.

In some embodiments, the method further comprises receiving, in the promise frame, an encrypted part of the packet that encodes a packet number of the packet to indicate that the proxy server will deliver the packet to the receiving device later. The method further comprises decrypting the encrypted part of the packet comprised in the promise frame to identify the packet that the proxy server will deliver to the receiving device later. In some such embodiments, the method further comprises receiving, in the promise frame, a packet count indicating how many packets are promised, according to the promise frame, to be delivered to the receiving device later.

Other embodiments are directed to a method, implemented by a proxy server. The method comprises receiving, from a sending device, a packet intended for a receiving device. The method further comprises sending, to the receiving device, a promise frame indicating that the proxy server will deliver the packet to the receiving device later. The method further comprises forwarding an acknowledgement of the packet from the receiving device to the sending device. The method further comprises delivering the packet to the receiving device after having forwarded the acknowledgement to the sending device.

In some embodiments, the method further comprises receiving a further packet intended for the receiving device, and sending a first encapsulation packet that comprises the further packet and the promise frame to the receiving device. Sending the promise frame to the receiving device comprises sending the promise frame within the first encapsulation packet. In some such embodiments, forwarding the acknowledgement of the packet comprises receiving, from the receiving device, a second encapsulation packet comprising the acknowledgement of the packet and a remaining portion. The remaining portion comprises an acknowledgement of the first encapsulation packet. Forwarding the acknowledgement of the packet further comprises sending the acknowledgement of the packet to the sending device without the remaining portion. The acknowledgement of the packet also acknowledges the further packet.

In some embodiments, the method further comprises including a packet number of the packet in the promise frame to indicate that the proxy server will deliver the packet to the receiving device later. In some such embodiments, the method further comprises including, in the promise frame, an indication of one or more additional packet numbers corresponding to additional packets received from the sending device to indicate that the proxy server will deliver the additional packets to the receiving device later. The indication of the one or more additional packet numbers comprises a number specifying how many contiguous packets immediately preceding the packet are comprised in the additional packets and are promised to be delivered, according to the promise frame, to the receiving device later. In some such embodiments, the method further comprises including, in the promise frame, a further indication of one or more other packet numbers corresponding to other packets not received from the sending device to indicate that, according to the promise frame, the proxy server does not promise delivery of the other packets to the receiving device. In some such embodiments, the other packets are contiguous and immediately precede the contiguous packets immediately preceding the packet. The indication of the one or more additional packet numbers further comprises a further number specifying how many contiguous packets immediately preceding the other packets are comprised in the additional packets and are promised to be delivered, according to the promise frame, to the receiving device later.

In some embodiments, the method further comprises the promise frame comprises a range count field indicating how many packet ranges are indicated by the promise frame.

In some embodiments, the method further comprises including, in the promise frame, an encrypted part of the packet that encodes a packet number of the packet to indicate that the proxy server will deliver the packet to the receiving device later. In some such embodiments, the method further comprises including, in the promise frame, a packet count indicating how many packets are promised, according to the promise frame, to be delivered to the receiving device later.

Other embodiments include corresponding devices. One or more such embodiments include a receiving device configured to receive, from a proxy server, a promise frame indicating that the proxy server will deliver a packet to the receiving device from a sending device later, and send an acknowledgement of the packet to the sending device via the proxy server. The receiving device is further configured to receive the packet from the proxy server after having sent the acknowledgement of the packet to the sending device via the proxy server.

In some embodiments, the receiving device is further configured to perform any of the methods described above with respect to a receiving device.

In some embodiments, the receiving device comprises processing circuitry and interface circuitry communicatively coupled to the processing circuitry, the processing circuitry being configured to perform any of the methods described above with respect to the receiving device.

Yet other embodiments include a proxy server configured to receive, from a sending device, a packet intended for a receiving device and send, to the receiving device, a promise frame indicating that the proxy server will deliver the packet to the receiving device later. The proxy server is further configured to forward an acknowledgement of the packet from the receiving device to the sending device, and deliver the packet to the receiving device after having forwarded the acknowledgement to the sending device.

In some embodiments, the proxy server is further configured to perform any of the methods described above with respect to a proxy server.

In some embodiments, the proxy server comprises processing circuitry and interface circuitry communicatively coupled to the processing circuitry, the processing circuitry being configured to perform any of the methods described above with respect to the proxy server.

Other embodiments include corresponding systems, computer programs, and carriers.

Although particular embodiments have been described below, it should be noted that some such embodiments may, in some cases, include one or more features described below, as will be further explained below.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a connection 140, generally, as opposed to discussion of particular instances of connections 140a, 140b).

DETAILED DESCRIPTION

TCP-based PEPs are usually deployed in cellular networks with the purpose of accelerating traffic and performing congestion control that is tailored to work well with the dynamics of access networks such as Radio Access Networks (RAN). They traditionally work by splitting end-to-end TCP connections into two separate connections, one between the server and the proxy and the other between the proxy and the client. In this way, two separate control loops are established, and the proxy can regulate how much data is acknowledged and/or needs to be buffered to perform proper congestion control in each of the control loops. Given that TCP headers and payload are generally not obfuscated and security (e.g., integrity protection) is not built-in to the protocol, a TCP proxy typically does not require any explicit configuration or consent from either of the communication endpoints.

Figure 1:
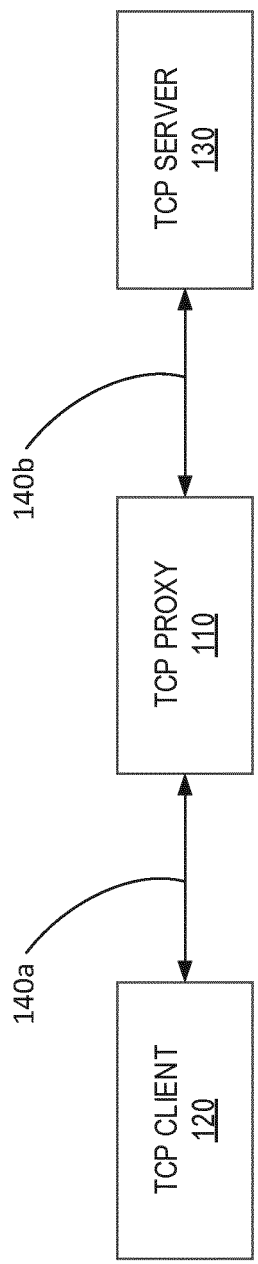
FIG. 1 is a schematic block diagram illustrating an example of TCP communication between a client, server, and proxy, according to one or more embodiments of the present disclosure.

FIG. 1 illustrates an example of a traditional TCP proxy 110 that divides what would otherwise be a single connection into two separate connections 140a, 140b, each of which has its own congestion control loop. The TCP proxy 110 forwards application layer data from one connection 140b to the other 140a (and in some embodiments, vice versa). The communication endpoints (i.e., the TCP client 120 and TCP server 130, in this example) do not require explicit knowledge of the TCP proxy 110.

Figure 2:
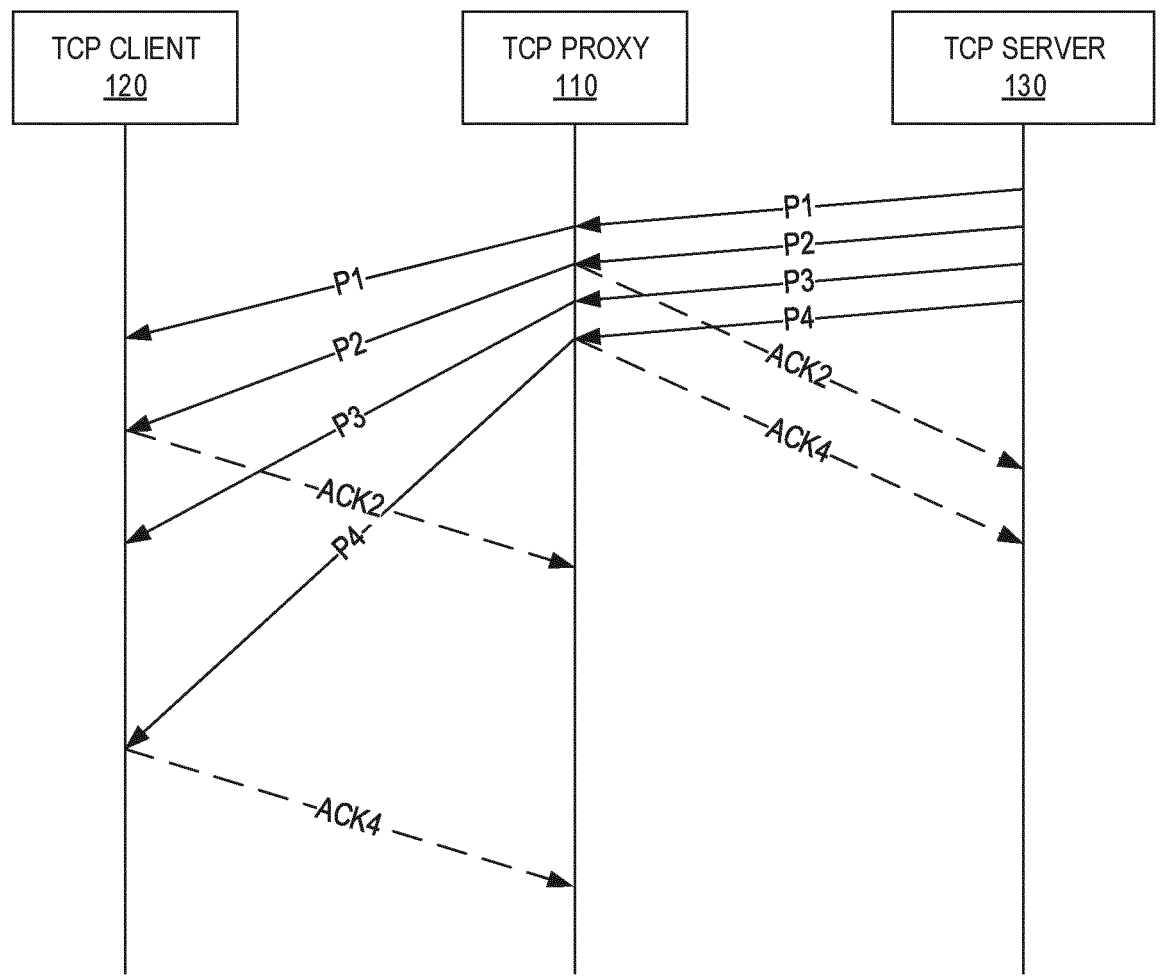
FIG. 2 is a signaling diagram illustrating an example of messages exchanged between client, server, and proxy, according to one or more embodiments of the present disclosure.

FIG. 2 illustrates example messaging between the TCP proxy 110, the TCP client 120, and the TCP server 130. As shown in FIG. 2, the TCP proxy 110 can transmit acknowledgements ACK2, ACK4 for packets P1-P4 received from the server, and can receive acknowledgements ACK2, ACK4 for packets P1-P4 forwarded to the client. Although not shown, the TCP proxy 110 can additionally or alternatively transmit acknowledgements for packets received from the TCP client 120, and can receive acknowledgements for packets forwarded to the TCP server 130. Moreover, the TCP proxy 110 can regulate the transmission rate of packets it receives, and can ensure that it has enough data buffered to perform congestion control on the leg over which the packets are forwarded. Accordingly, congestion control can be individually performed for either or both of connections 140a and 140b.

In the particular example illustrated in FIG. 2, the TCP proxy 110 receives packets from the TCP server 130 at a particular transmission rate, and stores the received packets in a buffer so that the TCP proxy 110 can forward them to the TCP client 120 more slowly than they were received. In other embodiments (not shown), the TCP proxy 110 may use a buffer of previously received packets to forward packets more quickly than they were received (i.e., as long as the buffer has not run out of packets). As previously discussed, in some embodiments, the TCP proxy 110 may perform similar functions for packets originating from the TCP client 120 and destined for the TCP server 130.

Because QUIC comes with built-in security such as authentication and encryption, a QUIC proxy (in contrast to the TCP proxy 110 discussed above) typically requires explicit configuration and consent from at least one of the communication endpoints. In a typical embodiment of a QUIC forwarding proxy, there are multiple security contexts in place, i.e., one "inner" context (which provides end-to-end protection between client and server), and at least one "outer" context (which protects communication between an endpoint and the proxy).

Figure 3:
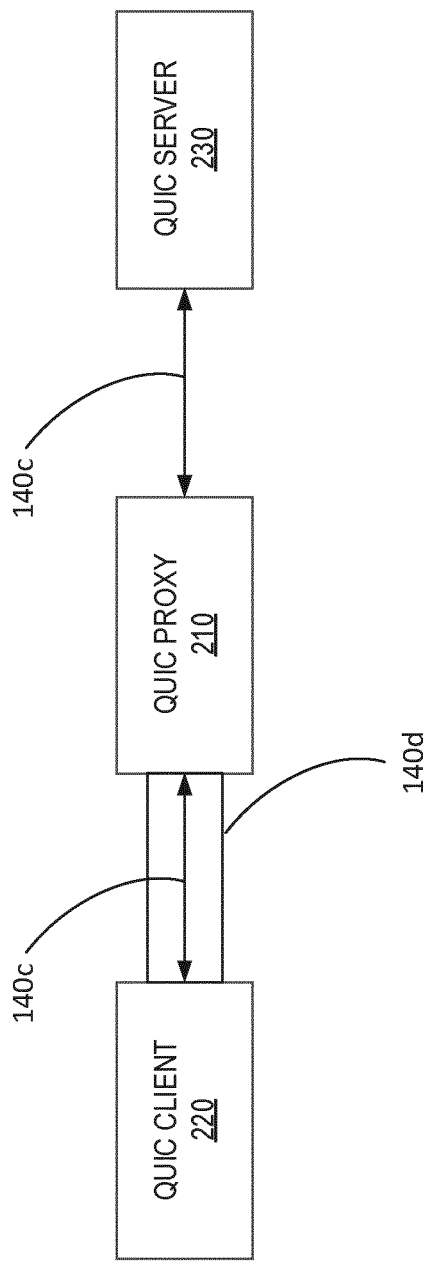
FIG. 3 is a schematic block diagram illustrating an example of QUIC communication between a client, server, and proxy, according to one or more embodiments of the present disclosure.

Although a common QUIC proxy deployment will have one outer security context for a connection 140d established between the QUIC client 220 and the QUIC proxy 210, as shown in FIG. 3, there is no such outer security context between the QUIC proxy 220 and the QUIC server 230. Instead, QUIC packets of an end-to-end connection 140c are tunneled between the QUIC client 220 and the QUIC proxy 210 via connection 140d, and use UDP datagrams between the QUIC proxy 210 and the QUIC server 230. In such a deployment, the end-to-end connection 140c is not split into two separate connections 140a, 140b as described above, and an end-to-end congestion control loop may take place between the QUIC server 230 and the QUIC client 220.

Notwithstanding, the outer security context between the QUIC proxy 210 and the QUIC client 220 may also be congestion controlled without the QUIC proxy 210 having an opportunity to influence the sending behavior of the QUIC server 230. In some such embodiments, this may lead to suboptimal performance and interaction between the end-to-end congestion control loop and the proxy-to-client control loop. Because the QUIC proxy 210 encapsulates part of an end-to-end connection 140c in an outer QUIC connection 140d having its own outer security context, the QUIC proxy 210 does not have the opportunity to directly acknowledge data received from the QUIC server 230. Instead, as shown in FIG. 4, the QUIC proxy 210 awaits acknowledgements from the client, and sends corresponding acknowledgements to the server in response.

Figure 4:
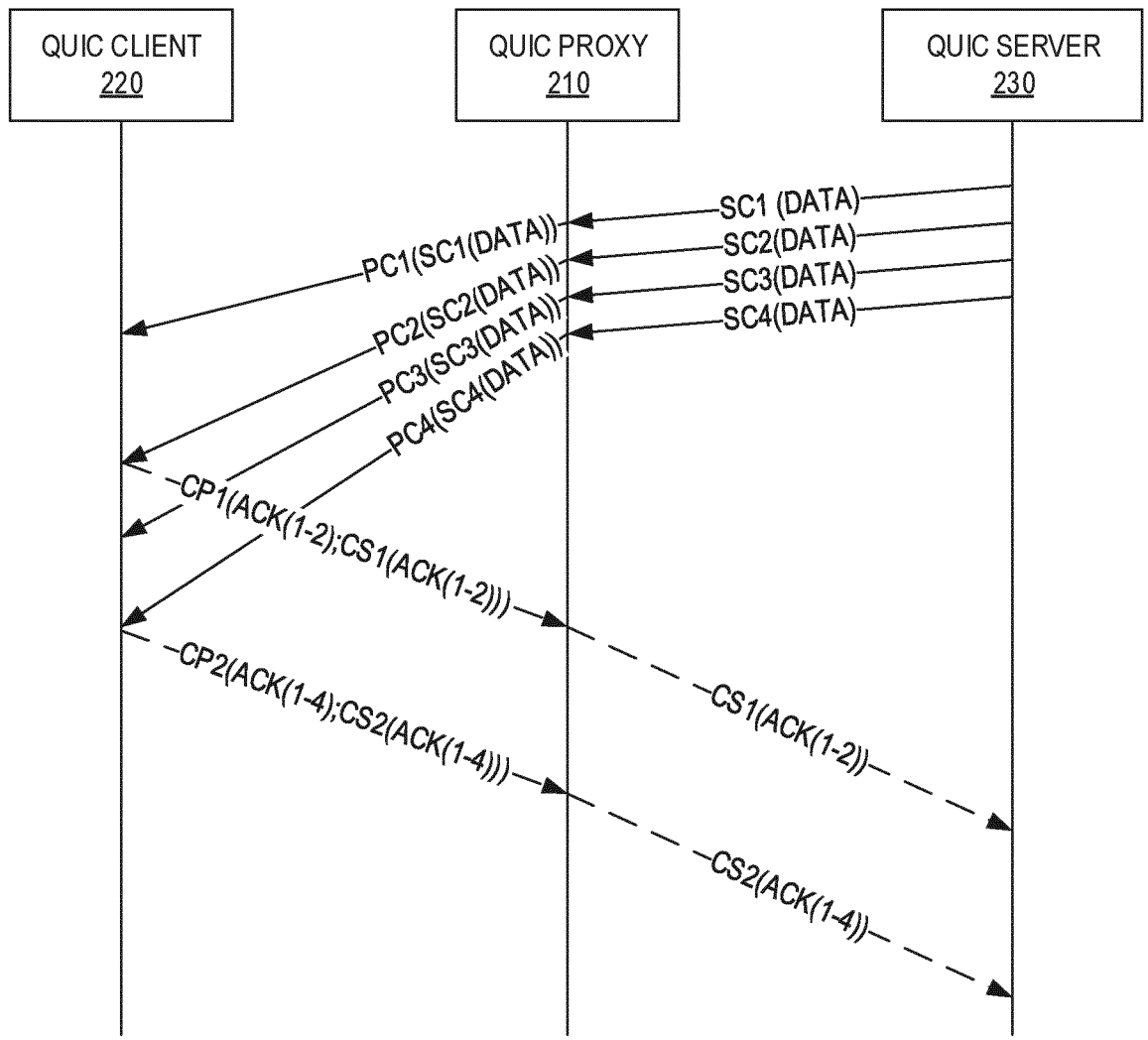
FIG. 4 and FIG. 5 are signaling diagrams illustrating examples of messages exchanged between client, server, and proxy, according to one or more embodiments of the present disclosure.

FIG. 4 illustrates a particular example of a QUIC proxy 210 that encapsulates part of an end-to-end QUIC connection 140c in an outer connection 140d between a QUIC client 220 and the QUIC proxy 210. A significant difference in this type of proxy as compared to a TCP PEP (e.g., as discussed above) is that because the end-to-end connection 140c is not split, the proxy does not have the opportunity to acknowledge packets received from the QUIC server 230 directly, and the two congestion control loops are layered between the QUIC client 220 and the QUIC proxy 210, which potentially leads to suboptimal interaction.

It should be noted that although particular embodiments of the present disclosure will be drawn specifically to the QUIC protocol, other embodiments may just as readily be applied to other protocols, proxies, endpoints, and/or devices using similarly inventive concepts. Therefore, it should not be deemed essential that any particular proxy, endpoint, or signaling discussed below support the QUIC protocol. That said, particular embodiments described herein may lend themselves particularly well to environments in which the QUIC protocol is used.

In view of the above, one or more embodiments of the present disclosure relate to a QUIC proxy 210 that notifies a peer about packets it has received from one or more other communicating peers, and promises to deliver those packets reliably. Upon receiving this information, the peer can acknowledge the reception of these packets towards the other communication peer(s) immediately, allowing the sender to open the CWIN more quickly. This, in turn, allows the proxy to buffer data and manage the congestion control loop, thereby reducing the risk of poor congestion control loop interaction, and still allowing the progress of data transfer between the end-to-end communicating peers.

In particular, embodiments of the present disclosure include a QUIC client 220 that establishes one or more QUIC connections 140c towards one or more QUIC servers 230 via a QUIC proxy 210. Between the QUIC client 220 and the QUIC proxy 210, the one or more end-to-end QUIC connections 140c are encapsulated in a single QUIC connection 140d. That is, the QUIC client 220 and QUIC proxy 210 are endpoints of the encapsulating QUIC connection 140d, such that data transferred from the QUIC server 230 is encapsulated by the QUIC proxy 210 before it is passed on towards the QUIC client 220. When the QUIC proxy 210 receives data from the QUIC server 230 at a higher rate than the QUIC proxy 210 is transmitting towards the QUIC client 220, the QUIC proxy 210 sends information to the QUIC client 220 regarding packets it has received and promises to deliver. In response to receiving this information regarding packets received by the QUIC proxy 210 that the QUIC proxy 210 promises to deliver, the QUIC client 220 sends corresponding QUIC acknowledgements on the relevant inner QUIC connection 140c to the QUIC server 230.

Such embodiments may enable the QUIC proxy to perform PEP functionality as supported by a single, appropriately configured connection endpoint. In the example above, the QUIC proxy 210 is able to apply congestion control mechanisms tailored to specific networks supporting the QUIC client 220 (e.g., RANs, satellite networks) while reducing suboptimal interaction with the inner layer's server-side congestion control. Moreover, use of the QUIC proxy 210 does not break the end-to-end confidentiality of the QUIC packet payload. Instead, according to embodiments, an encrypted packet number of the inner connection 140c is visible to the QUIC proxy 210. Reporting using this number is sufficient for the QUIC proxy 210 to identify and promise to deliver packets held at the QUIC proxy 210, so that the QUIC client 220 can send acknowledgements back to the QUIC server 230 in support of congestion control. Further, multiple parallel end-to-end connections 140c can be managed within a single congestion control loop between the QUIC proxy 210 and the QUIC client 220, which may allow resource sharing between multiple connections 140 to be enhanced.

Figure 5:
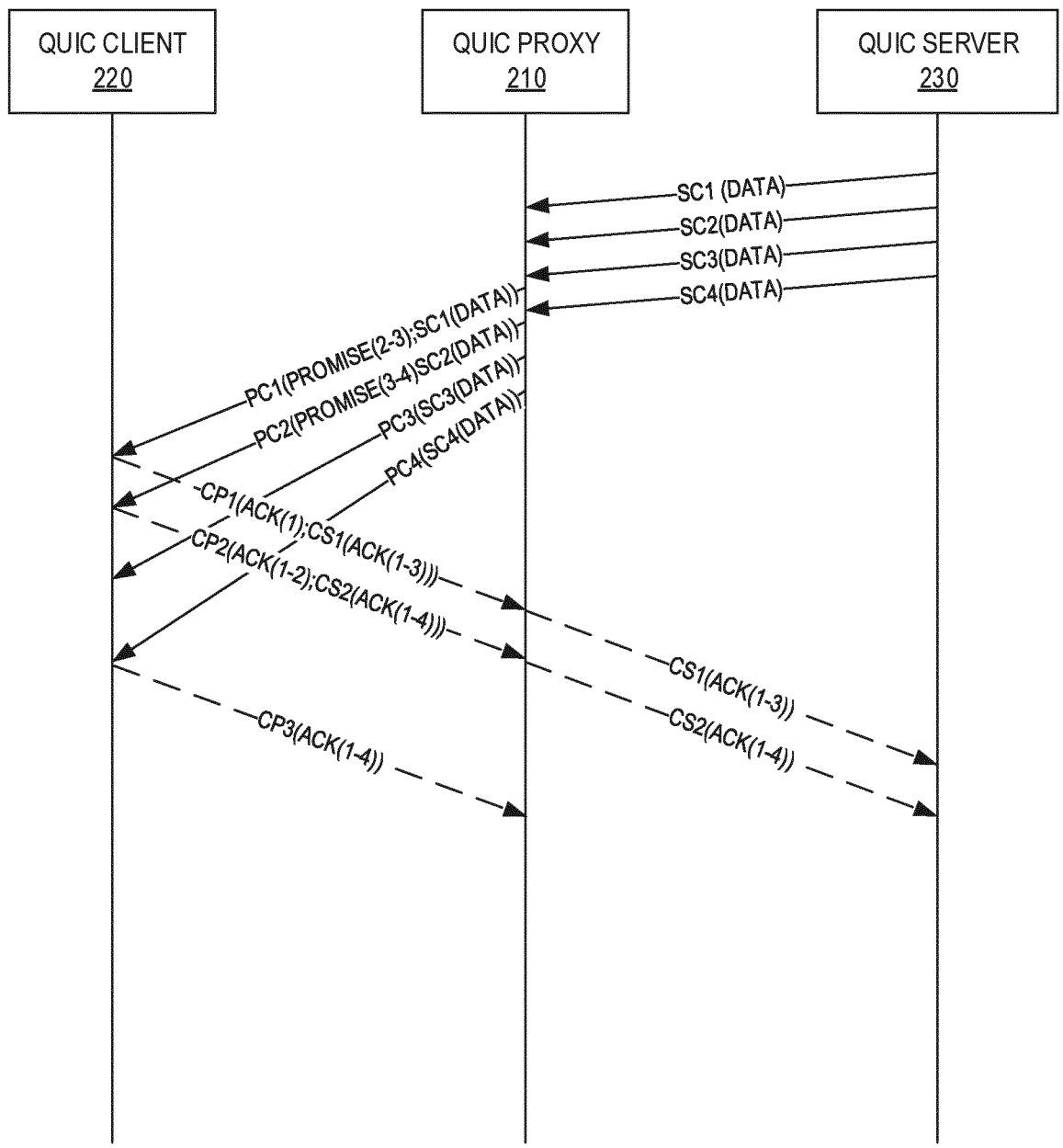

In view of the above, and as shown in FIG. 5, embodiments of the present disclosure include a QUIC proxy 210 that encapsulates packets it receives from one or more QUIC servers 230 in an outer QUIC layer that is sent towards a QUIC client 220. If (as shown in FIG. 5) the QUIC proxy 210 receives and buffers additional packets from the QUIC server 230 for later transmission to the QUIC client 210 (e.g., the QUIC proxy is not yet able to forward these additional packets for congestion control reasons), the QUIC proxy 210 appends a "promise frame" that contains the packet numbers of those not-yet-forwarded packets. The QUIC client 220, upon receiving a promise frame, acknowledges those packets towards the QUIC server(s) 230 that sent them as if those packets had actually been received by the QUIC client 220. This allows the QUIC server(s) 230 to progress with the data transfer between QUIC client 220 and QUIC server(s) 230. That is, the QUIC server 230 can continue to transmit packets as if they had been delivered to the QUIC client 220, thereby preventing congestion control performed on the client leg from slowing the transmission rate on the server leg of the end-to-end communication 140c.

In the particular example of FIG. 5, there are four types of packets, which for purposes of illustration are labeled as SC, PC, CP, and CS packets. The SC packets are packets sent by the QUIC server 230 and carry data intended for the QUIC client 220. The PC packets are packets sent by the QUIC proxy 210 to the QUIC client 220. These PC packets may comprise one or more SC packets and, in some cases, include a frame that specifies the packet numbers of packets the QUIC proxy 210 has received, promises to deliver, and has not yet transmitted.

The CP packets are packets sent by the QUIC client 220 to the QUIC proxy 210. The CP packets comprise acknowledgements of packets actually received by the QUIC client 220. In some cases, these CP packets encapsulate one or more CS packets, which are packets sent by the QUIC client 220 and intended for the QUIC server 230. The CS packets comprise acknowledgements of packets actually received by the QUIC client 220, and the packets that the QUIC proxy 210 promised to deliver.

Now following the flow of the diagram shown in FIG. 5, data is transmitted in packets from the QUIC server 230 towards a QUIC client 220 via a QUIC proxy 210 (i.e., in the SC packets). The QUIC proxy 210 encapsulates the SC packets in PC packets and forwards those PC packets towards the QUIC client 220. The QUIC proxy 210 includes a frame (i.e., a promise frame) in some of the encapsulating PC packets (i.e., in PC1 and PC2, in this example). These additional frames indicate the packet numbers of packets the QUIC proxy 210 has received and intends to deliver to the QUIC client 220 (i.e., the SC1-4 packets received thus far). The QUIC client 220 sends, towards the QUIC server 230, CS packets that include acknowledgements of the SC packets received by the QUIC client 220 and the SC packets that the QUIC proxy 210 has promised to deliver. The CS packets are encapsulated by CP packets, which acknowledge the SC packets actually received (i.e., but not the packets that were promised by the QUIC proxy 210 and have not yet arrived). In response to receiving CP packets that include CS packets, the QUIC proxy 210 decapsulates the CP packets and forwards the CS packets to the QUIC server 230.

In view of the above, the QUIC proxy 210 may need some way to identify the individual packets. As discussed above, QUIC packet numbers are typically part of the QUIC packet header, which is encrypted using a key that is different from the one that is used to encrypt the QUIC packet payload. Thus, the structure of a promise frame may depend on whether or not the QUIC proxy 210 has access to the end-to-end header protection key. If the QUIC client 220 exposes the end-to-end header protection key to the QUIC proxy 210, the QUIC client 220 may add the header protection key to a packet sent towards the QUIC proxy 210 after the key has been derived (e.g., preferably adding this key to the first such packet). In general, each end-to-end connection 140c would likely have its own header protection key.

Figure 6:
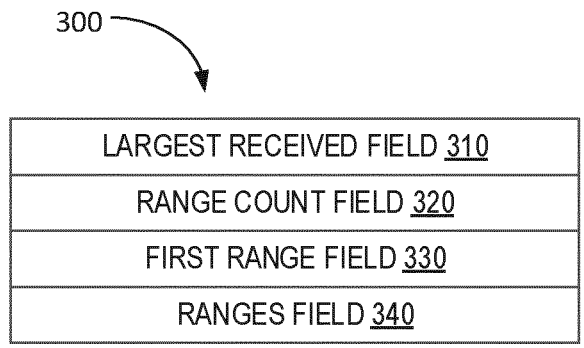
FIGS. 6-8 are schematic block diagrams illustrating example frame structures, according to embodiments of the present disclosure.
Figure 7:
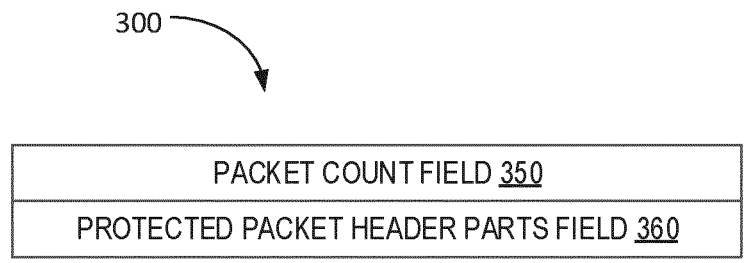
Figure 8:
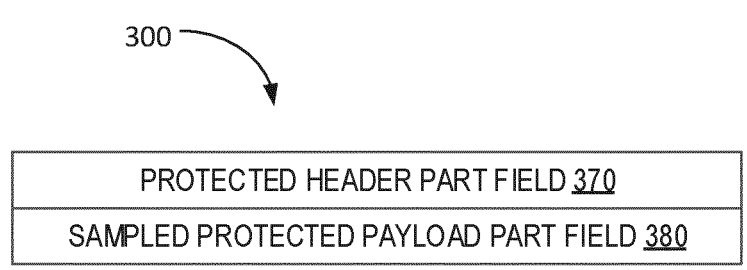

As discussed above, a promise frame comprises of a set of one or more end-to-end QUIC packet numbers that the QUIC proxy 210 has received from the QUIC server 230 and promises to deliver to the QUIC client 220. The structure of the promise frame may depend on whether or not the QUIC proxy 210 has access to the end-to-end header protection key. Although example structures of promise frames are discussed below and are illustrated in FIGS. 6-8, other examples may have other structures. That said, several embodiments apply a similar general concept of how encrypted and non-encrypted packet numbers of one or more QUIC connections 140 may be handled. It should further be noted that a promise frame may be part of the core QUIC transport protocol or may be sent as a QUIC payload, depending on the embodiment. Further, as discussed above, embodiments that are applied to non-QUIC protocols may have similar features and variations.

In some embodiments, the QUIC proxy 210 decrypts the end-to-end packet headers (e.g., after having received the QUIC header protection key from the client) and creates a promise frame which identifies one or more packets that the QUIC proxy 210 promises to deliver. In some embodiments, the promise frame comprises one or more fields for indicating the promised packets. For example, the promise frame may include a field that specifies the number of a particular packet promised for delivery, a field that indicates a range of contiguous packets succeeding or preceding the particular packet, and/or one or more fields that indicate one or more further ranges of contiguous packets, e.g., that are (and/or are not) promised.

FIG. 6 illustrates such an example. The promise frame 300 comprises a largest received field 310, a range count field 320, a first range field 330, and a ranges field 340. The largest received field 310 indicates the largest packet number received by the proxy and being promised for future delivery to the client. The range count field 320 indicates how many ranges of packet numbers the promise frame 300 indicates using the first range and/or ranges fields 330, 340. If the proxy has received all packets up to the largest received packet, this field may be zero.

The first range indicates a number of contiguous packets preceding the packet indicated in the largest received field 310. Thus, if the largest received field 310 is set to the integer value 999, and the first range field 330 is set to 6, this may indicate that the QUIC proxy 210 has received packet number 999 and its six preceding packets (i.e., packets 993-999), and promises to deliver those packets to the QUIC client 220 later.

The ranges field 340 indicates one or more additional ranges of contiguous packets that are alternately not promised and promised. Such a field may be useful when there are gaps between packets that that the QUIC proxy 210 can promise to the QUIC client 220. For example, there may be packets that the QUIC proxy 210 has not yet received, or packets that were received that contain errors and would not be appropriate to forward.

Thus, if the largest received field 310 indicates the value 999, the first range field 330 indicates the value 6, and the ranges field 340 indicates the values 4, 6, and 5, then packet numbers 993-999 are promised (as discussed in the example above, and as indicated by the largest received and first range fields 310, 330), 989-992 are not promised for delivery (as indicated by the first value of the ranges field 340), packets 983-988 are promised (as indicated by the second value of the ranges field 340), and packets 978-982 are promised (as indicated by the third value in the ranges field 340). In such an example, the range count field 320 may be set to four to indicate the range indicated in the first range field 330, and the three ranges indicated in the ranges field 340.

Although in some embodiments, each of the largest received, range count, first range, and ranges fields 310, 320, 330, 340 are included in the promise frame 300, in other embodiments, additional, fewer, or other fields may be included in the promise frame 300. For example, if only one packet is being promised, the promise field may comprise the largest received field 310, and may omit the range count, first range, and ranges fields 320, 330, 340. In other embodiments, the largest received field 310 may specify the one packet being promised, and one or more of the other fields may be zero.

In other embodiments, the promise frame 300 may comprise the largest received field 310 and the first range field 330, and may omit the range count and range fields (e.g., when only one range is being promised).

In other embodiments, the promise frame 300 may omit the range count and first range fields 320, 330 and terminate the set of ranges indicated in the ranges field 340 with a zero when no further ranges are indicated.

Each of these fields may be of any appropriate type to convey their respective meanings. For example, the largest received, range count, and first range fields 310, 320, 330 may be variable-length integer fields, and the ranges field 340 may include one or more variable-length integer subfields. Other embodiments may include fields of fixed length, or representing other data types (e.g., text).

In some embodiments, the proxy does not have access to the headers of received QUIC packets. For example, the QUIC proxy 210 may not have access to the end-to-end header protection key. In at least some such embodiments, the QUIC proxy 210 appends encrypted header data to the promise frame 300. For each packet that the QUIC proxy 210 will notify the QUIC client 220 about, the QUIC proxy 210 extracts the raw packet data required for decrypting the header. The data required to decrypt the packet number consists of 4 octets from the start of the packet number field and N octets of encrypted packet data that follow the packet header. The exact value of N is dependent on the encryption algorithm in use. For example, in at least one version of the QUIC specification, that value is always 16.

As the packet number is not part of the invariants of the QUIC header, it is possible that new cryptography algorithms (as specified in a new QUIC version) will change the number of octets required to decrypt the packet number. Accordingly, in some embodiments, the QUIC client 220 signals to the QUIC proxy 210 where the portions of the header required to decrypt the packet number are located within the packet. For example, the QUIC client 220 may signal to the QUIC proxy 210 an offset from the start of the header indicating where the required encrypted packet data octets begin, and the value of N indicating the number of octets of encrypted packet data required to decrypt the header. Such embodiments may enable the QUIC proxy 210 to copy the relevant sections of the packet header into a promise frame 300 so that the QUIC client 220, upon receiving such a promise frame 300, can decrypt these sections and determine the number of the packet received and promised for future delivery by the QUIC proxy 210. Such embodiments may enable the QUIC proxy 210 to provide promise frames 300 to the QUIC client 220 even if certain aspects of the header protection scheme change in future versions of QUIC.

FIG. 7 illustrates an example of a promise frame 300 structure in which packet numbers are encrypted. The promise frame 300 comprises a packet count field 350 and a protected packet header parts field 360. In this example, the packet count field 350 indicates an integer number of packets that the QUIC proxy 210 has observed, e.g., in total or in addition to packet that the promise frame 300 is provided along with. In particular, as shown in FIG. 5, the promise frame 300 may identify one or more packets other than the SC packet encapsulated in the same PC packet being sent to the QUIC client 220. In this example, the encrypted packet numbers and the associated set of data required for decryption are appended after the packet count field 350 (i.e., in the protected packet header parts field 360) for as many packets as is indicated in the packet count field 350, so that the QUIC client 220 may use those pieces to determine the one or more packets being promised.

FIG. 8 illustrates another example of a promise frame 300 for promising delivery of packets when the QUIC proxy 210 is unable to access the packet numbers (e.g., because they are encrypted, and the QUIC proxy 210 does not have the header protection key required to decrypt the relevant portion of the header). In this example, the length of the fields required to decrypt a packet number are the same for each packet. Accordingly, a specific length field is not encoded in this example promise frame 300. Instead, this promise frame 300 includes, for each packet promised, a protected header part field 370 and a sampled protected payload part field 380. In this example, the protected header part field 370 and sampled protected payload part field 380 have lengths of 32 bits and 128 bits, respectively. Other examples may include a single protected header part field 370 and one or more sampled protected payload part fields 380. For example, if the protected header part is the same (or is derivable) for each packet, the information in the protected header part field 370 need not be explicitly included for each packet, as the QUIC client 220 can be relied upon to use the correct information to decrypt the packet number based on the information in the single protected header part field provided.

As discussed above, for purposes of explaining various features and concepts of particular embodiments, examples were discussed in the context of a proxy, client, and server that support the QUIC protocol. Other embodiments may use other protocols. Indeed, other protocols that encrypt or otherwise obfuscate the identities of packets (e.g., due to certain integrated security features) may be suitable for applying the same or similar concepts.

Figure 9:
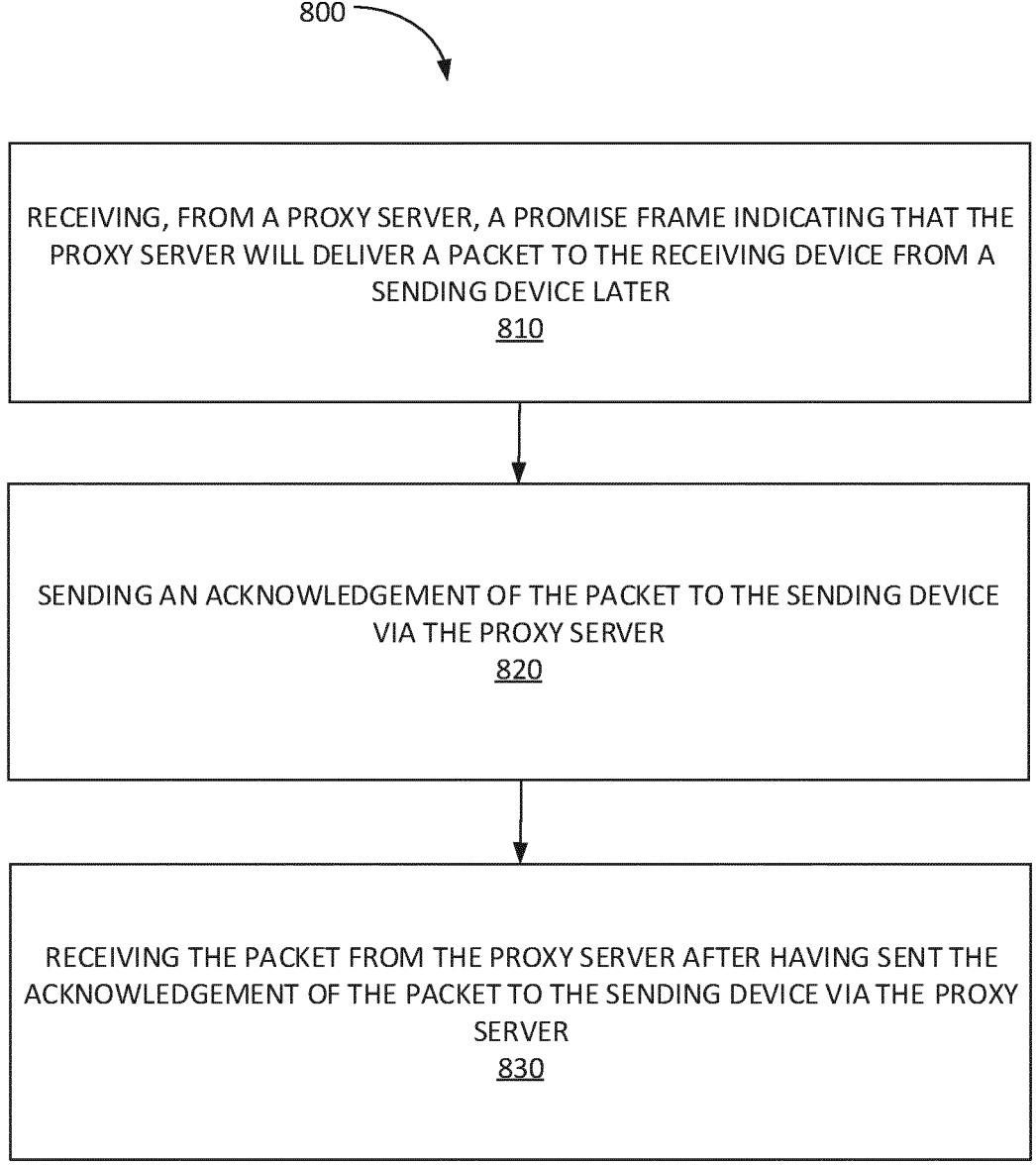
FIGS. 9 and 10 are flow diagrams illustrating example methods, according to embodiments of the present disclosure.

In view of all of the above, and as shown in FIG. 9, embodiments of the present disclosure include a method 800 implemented by a receiving device (e.g., an endpoint to a QUIC connection). The method 800 comprises receiving, from a proxy server, a promise frame 300 indicating that the proxy server will deliver a packet to the receiving device from a sending device later (block 810). The method 800 further comprises sending an acknowledgement of the packet to the sending device via the proxy server (block 820), and receiving the packet from the proxy server after having sent the acknowledgement of the packet to the sending device via the proxy server (block 830).

Figure 10:
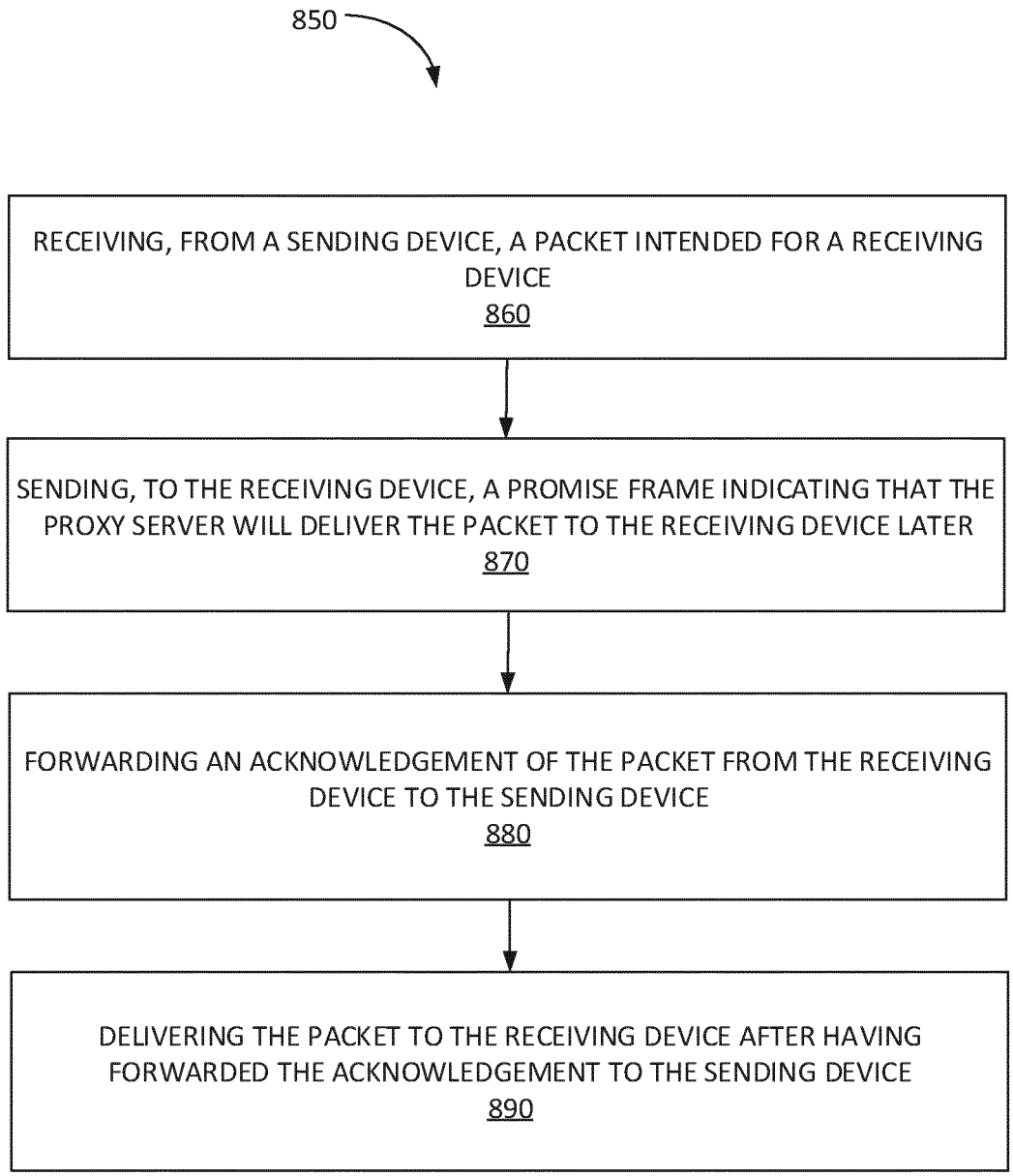

Other embodiments include a method 850 implemented by a proxy server, as shown in FIG. 10. The method 850 comprises receiving, from a sending device, a packet intended for a receiving device (block 860). The method 850 further comprises sending, to the receiving device, a promise frame 300 indicating that the proxy server will deliver the packet to the receiving device later (block 870). The method 850 further comprises forwarding an acknowledgement of the packet from the receiving device to the sending device (block 880), and delivering the packet to the receiving device after having forwarded the acknowledgement to the sending device (block 890).

Figure 11:
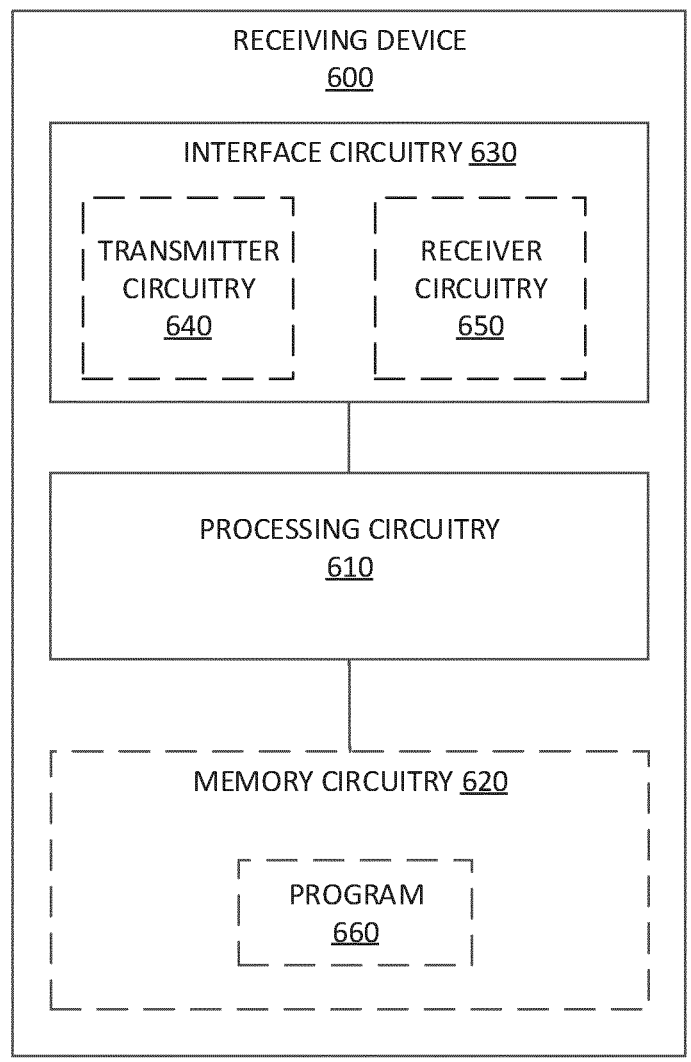
FIG. 11 is a schematic block diagram illustrating an example receiving device, according to one or more embodiments of the present disclosure.

Further, as shown in FIG. 11, other embodiments include a receiving device 600. The receiving device 600 of FIG. 11 comprises processing circuitry 610 and interface circuitry 630. The processing circuitry 610 is communicatively coupled to the interface circuitry 630, e.g., via one or more buses. In some embodiments, the network node 600 further comprises memory circuitry 620 that is communicatively coupled to the processing circuitry 610, e.g., via one or more buses. According to particular embodiments, the processing circuitry 610 is configured to perform one or more of the methods described herein (e.g., the method 800 illustrated in FIG. 9). Additionally or alternatively, the receiving device 600 may be an endpoint to a QUIC connection (such as a QUIC client 220, a QUIC server 230, and/or a User Equipment (UE)), according to embodiments.

Figure 12:
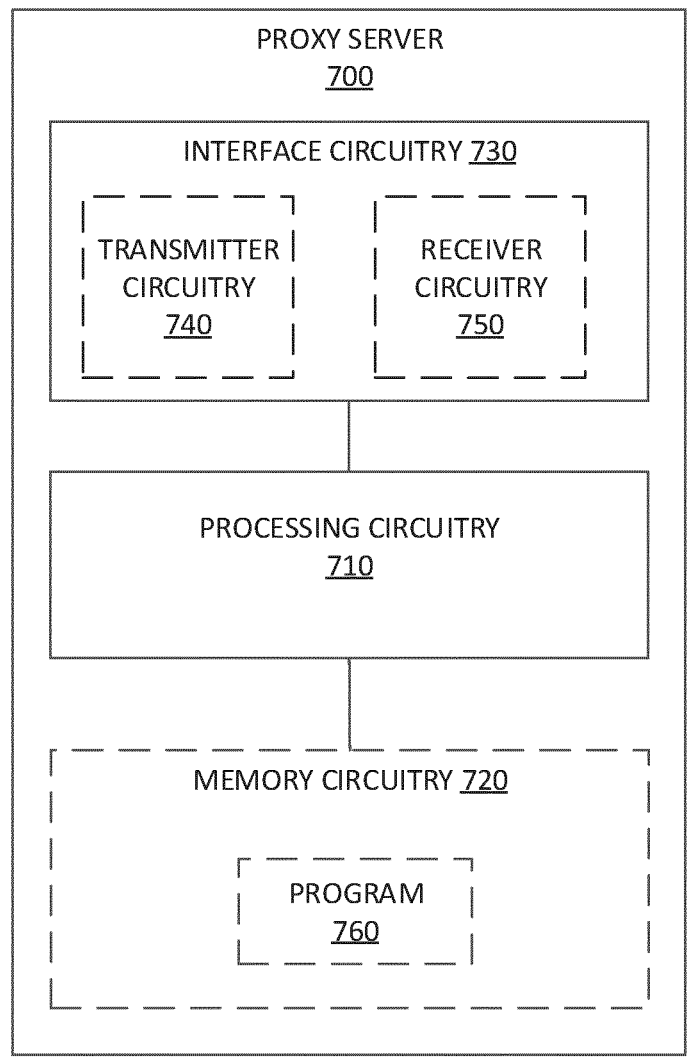
FIG. 12 is a schematic block diagram illustrating an example proxy server, according to one or more embodiments of the present disclosure.

In addition, as shown in FIG. 12, other embodiments include a proxy server 700 (e.g., a QUIC proxy 210). The proxy server 700 of FIG. 12 comprises processing circuitry 710 and interface circuitry 730. The processing circuitry 710 is communicatively coupled to the interface circuitry 730, e.g., via one or more buses. In some embodiments, the proxy server 700 further comprises memory circuitry 720 that is communicatively coupled to the processing circuitry 710, e.g., via one or more buses. According to particular embodiments, the processing circuitry 710 is configured to perform one or more of the methods described herein (e.g., the method 850 illustrated in FIG. 10). Additionally or alternatively, the proxy server 700 may be a network node, QUIC proxy 210, access node, base station, gateway, router, switch, and/or other network device.

The processing circuitry 610, 710 of either device 600, 700 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 610, 710 may be programmable hardware capable of executing software instructions of a computer program 660, 760 stored in the memory circuitry 620, 720 whereby the processing circuitry 610, 710 is configured. The memory circuitry 620, 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 630, 730 may be a controller hub configured to control the input and output (I/O) data paths of its respective device 600, 700. Such I/O data paths may include data paths for exchanging signals over a communications network, data paths for exchanging signals with a user, and/or data paths for exchanging data internally among components of the network node 600, 700. For example, the interface circuitry 630, 730 may comprise a transceiver configured to send and receive communication signals over one or more of a cellular network, Ethernet network, or optical network. The interface circuitry 630, 730 may be implemented as a unitary physical component, or as a plurality of physical components that are contiguously or separately arranged, any of which may be communicatively coupled to any other, or may communicate with any other via the processing circuitry 610, 710. For example, the interface circuitry 630, 730 may comprise transmitter circuitry 640, 740 configured to send communication signals over a communications network and receiver circuitry 650, 750 configured to receive communication signals over the communications network. Similarly, the interface circuitry 630, 730 may comprise a display and/or keyboard. Other embodiments may include other permutations and/or arrangements of the above and/or their equivalents.

According to embodiments of the receiving device 600 illustrated in FIG. 11, the processing circuitry 610 is configured to receive, from a proxy server 700, a promise frame 300 indicating that the proxy server 700 will deliver a packet to the receiving device 600 from a sending device later, and send an acknowledgement of the packet to the sending device via the proxy server 700. The processing circuitry 610 is further configured to receive the packet from the proxy server 700 after having sent the acknowledgement of the packet to the sending device via the proxy server 700.

According to embodiments of the proxy server 700 illustrated in FIG. 12, the processing circuitry 710 is configured to receive, from a sending device, a packet intended for a receiving device 600, and send, to the receiving device 600, a promise frame 300 indicating that the proxy server 700 will deliver the packet to the receiving device 600 later. The processing circuitry 710 is further configured to forward an acknowledgement of the packet from the receiving device 600 to the sending device, and deliver the packet to the receiving device 600 after having forwarded the acknowledgement to the sending device.

Other embodiments of the present disclosure include corresponding computer programs. In one such embodiment, the computer program comprises instructions which, when executed on processing circuitry of a receiving device 600, cause the receiving device 600 to carry out any of the respective processing described above. In another such embodiment, the computer program comprises instructions which, when executed on processing circuitry of a proxy server 700, cause the proxy server 700 to carry out any of the respective processing described above. A computer program in either regard may comprise one or more code modules corresponding to the means or units described above.

Embodiments further include a computer program product comprising program code portions for performing the steps of any of the embodiments herein when the computer program product is executed by a computing device. This computer program product may be stored on a computer readable recording medium.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method, implemented by a receiving device, the method comprising:
   receiving, from a proxy server, a promise frame that indicates that the proxy server will deliver a packet from a sending device that is buffered at the proxy server to the receiving device at a later time;
   in response to receiving the promise frame and prior to the receiving device receiving the packet from the proxy server, sending an acknowledgement to the sending device via the proxy server that indicates that the packet has been received by the receiving device; and
   receiving the packet from the proxy server after having sent the acknowledgement indicating that the packet has been received.

2. The method of claim 1, further comprising:
   receiving, from the proxy server, a first encapsulation packet that comprises a further packet sent by the sending device and the promise frame;
   wherein receiving the promise frame from the proxy server comprises receiving the promise frame within the first encapsulation packet.

3. The method of claim 2, wherein:
   sending the acknowledgement of the packet comprises sending the acknowledgement of the packet in a second encapsulation packet;
   the second encapsulation packet further comprises an acknowledgement of the first encapsulation packet; and
   the acknowledgement of the packet also acknowledges the further packet.

4. The method of claim 1, further comprising receiving, in the promise frame, a packet number of the packet, wherein the packet number indicates that the proxy server will deliver the packet to the receiving device later.

5. The method of claim 4, further comprising:
   receiving, in the promise frame, an indication of one or more additional packet numbers corresponding to additional packets received by the proxy server that the proxy server promises to deliver to the receiving device later;
   wherein the indication of the one or more additional packet numbers comprises a number specifying how many contiguous packets immediately preceding the packet are comprised in the additional packets and are promised to be delivered, according to the promise frame, to the receiving device later.

6. The method of claim 5, further comprising receiving, in the promise frame, a further indication of one or more other packet numbers corresponding to other packets not received by the proxy server from the sending device and indicating that, according to the promise frame, delivery of the other packets to the receiving device is not promised by the proxy server.

7. The method of claim 6, wherein:
   the other packets are contiguous and immediately precede the contiguous packets immediately preceding the packet;
   the indication of the one or more additional packet numbers further comprises a further number specifying how many contiguous packets immediately preceding the other packets are comprised in the additional packets and are promised to be delivered, according to the promise frame, by the proxy server to the receiving device later.

8. The method of claim 1, wherein the promise frame comprises a range count field indicating how many packet ranges are indicated by the promise frame.

9. The method of claim 1, further comprising:
   receiving, in the promise frame, an encrypted part of the packet that encodes a packet number of the packet to indicate that the proxy server will deliver the packet to the receiving device later; and
   decrypting the encrypted part of the packet comprised in the promise frame to identify the packet that the proxy server will deliver to the receiving device later.

10. The method of claim 9, further comprising receiving, in the promise frame, a packet count indicating how many packets are promised, according to the promise frame, to be delivered to the receiving device later.

11. A method, implemented by a proxy server, the method comprising:
   receiving, from a sending device, a packet intended for a receiving device;
   buffering the packet at the proxy server;
   sending, to the receiving device, a promise frame indicating that the proxy server will deliver the packet that is buffered at the proxy server to the receiving device at a later time;
   prior to delivering the packet to the receiving device, receiving an acknowledgement in response to the promise frame from the receiving device that indicates that the receiving device received the packet;
   forwarding the acknowledgement to the sending device; and
   delivering the packet to the receiving device after having forwarded the acknowledgement to the sending device.

12. The method of claim 11, further comprising:
receiving a further packet intended for the receiving device;
sending a first encapsulation packet that comprises the further packet and the promise frame to the receiving device;
wherein sending the promise frame to the receiving device comprises sending the promise frame within the first encapsulation packet.

13. The method of claim 12, wherein forwarding the acknowledgement of the packet comprises:
receiving, from the receiving device, a second encapsulation packet comprising the acknowledgement of the packet and a remaining portion, wherein the remaining portion comprises an acknowledgement of the first encapsulation packet;
sending the acknowledgement of the packet to the sending device without the remaining portion, wherein the acknowledgement of the packet also acknowledges the further packet.

14. The method of claim 11, further comprising including, in the promise frame, a packet number of the packet to indicate that the proxy server will deliver the packet to the receiving device later.

15. The method of claim 14, further comprising:
including, in the promise frame, an indication of one or more additional packet numbers corresponding to additional packets received from the sending device to indicate that the proxy server will deliver the additional packets to the receiving device later;
wherein the indication of the one or more additional packet numbers comprises a number specifying how many contiguous packets immediately preceding the packet are comprised in the additional packets and are promised to be delivered, according to the promise frame, to the receiving device later.

16. The method of claim 15, further comprising including, in the promise frame, a further indication of one or more other packet numbers corresponding to other packets not received from the sending device to indicate that, according to the promise frame, the proxy server does not promise delivery of the other packets to the receiving device.

17. The method of claim 16, wherein:
the other packets are contiguous and immediately precede the contiguous packets immediately preceding the packet;
the indication of the one or more additional packet numbers further comprises a further number specifying how many contiguous packets immediately preceding the other packets are comprised in the additional packets and are promised to be delivered, according to the promise frame, to the receiving device later.

18. The method of claim 11, wherein the promise frame comprises a range count field indicating how many packet ranges are indicated by the promise frame.

19. The method of claim 11, further comprising including, in the promise frame, an encrypted part of the packet that encodes a packet number of the packet to indicate that the proxy server will deliver the packet to the receiving device later.

20. The method of claim 19, further comprising including, in the promise frame, a packet count indicating how many packets are promised, according to the promise frame, to be delivered to the receiving device later.

21. A receiving device comprising:
processing circuitry and interface circuitry communicatively connected to the processing circuitry, wherein the processing circuitry is configured to:
receive, from a proxy server, a promise frame indicating that indicates that the proxy server will deliver a packet from a sending device that is buffered at the proxy server to the receiving device at a later time;
in response to receiving the promise frame and prior to the receiving device receiving the packet from the proxy server, send an acknowledgement to the sending device via the proxy server that indicates that the packet has been received by the receiving device; and
receive the packet from the proxy server after having sent the acknowledgement indicating that the packet has been received.

22. A proxy server comprising:
processing circuitry and interface circuitry communicatively connected to the processing circuitry, wherein the processing circuitry is configured to:
receive, from a sending device, a packet intended for a receiving device;
buffer the packet at the proxy server;
send, to the receiving device, a promise frame indicating that the proxy server will deliver the packet that is buffered at the proxy server to the receiving device at a later time;
prior to delivering the packet to the receiving device, receiving an acknowledgement in response to the promise packet from the receiving device that indicates that the receiving device received the packet;
forward the acknowledgement to the sending device; and
deliver the packet to the receiving device after having forwarded the acknowledgement to the sending device.

* * * * *